United States Patent
Zheng et al.

(10) Patent No.: US 8,126,952 B2
(45) Date of Patent: Feb. 28, 2012

(54) UNIFIED INVERSE DISCRETE COSINE TRANSFORM (IDCT) MICROCODE PROCESSOR ENGINE

(75) Inventors: Zheng-Yu Zheng, Austin, TX (US); Zheng-Wei Jiang, Shanghai (CN); Franciscus Sijstermans, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 916 days.

(21) Appl. No.: 12/147,195

(22) Filed: Jun. 26, 2008

(65) Prior Publication Data

US 2009/0150469 A1    Jun. 11, 2009

(30) Foreign Application Priority Data

Dec. 10, 2007    (CN) .............................. 2007 1 195330

(51) Int. Cl.
*G06F 17/14* (2006.01)

(52) U.S. Cl. ....................................................... 708/402
(58) Field of Classification Search .......... 708/400–410, 708/209

See application file for complete search history.

(56) References Cited

U.S. PATENT DOCUMENTS

2009/0292750 A1* 11/2009 Reyzin et al. ................. 708/209
2010/0070547 A1*  3/2010 Chan ............................. 708/209

* cited by examiner

*Primary Examiner* — Tan V Mai
(74) *Attorney, Agent, or Firm* — Patterson & Sheridan, LLP

(57) ABSTRACT

The present invention provides a unified inverse discrete cosine transform (IDCT) microcode processor engine, which is able to process IDCT with different video standards and also achieves the processing speed requirement. The microcode processor engine comprises a read unit for reading input data; a shift left unit comprising: a first shift left block for left-shifting input data; and a second shift left block for left-shifting input data; an add unit for adding data output from the shift left unit; and a shift right unit for right-shifting data output from the add unit. The present invention also provides a system of inverse discrete cosine transform.

20 Claims, 3 Drawing Sheets

UNIFIED INVERSE DISCRETE COSINE TRANSFORM (IDCT) MICROCODE PROCESSOR ENGINE

CROSS-REFERENCE TO RELATED APPLICATIONS

This application claims benefit of Chinese patent application number 200710195330.0, filed Dec. 10, 2007, which is herein incorporated by reference.

FIELD OF INVENTION

The present invention relates to video decoding, and, more specifically, to an Inverse Discrete Cosine Transform (IDCT) microcode processor engine used in video decoding for different encoding standards.

BACKGROUND

Digital video streams are typically encoded using one of many different encoding standards. For example, a digital video stream may be compressed into a data format that requires fewer bits. This compression can be lossless so that the original video stream can be recreated upon decoding, or it can be lossy so that an exact replica of the original video stream cannot be recreated, but where the decoding of the compressed data will be more efficient.

There are currently a large number of video encoding standards, and new standards are frequently emerging. Examples of current video encoding standards include JPEG (Joint Photographic Experts Group), MPEG (Moving Pictures Experts Group), MPEG-2, MPEG-3, MPEG-4, H.263, H.263+, H.264, and proprietary standards such as Real Video and Windows Media. In order to fully realize the benefits of digital video, a user requires access to decoders that are capable of decoding all common encoding standards.

Currently, a hardware implemented IDCT processor is used to facilitate the requirement of speed. However, the hardware implemented IDCT processor can only perform processes of one standard. Hence the processor cannot employ other commonly used standards and has a poor portability. Another attempt was made to overcome these problems by constructing an IDCT processor that adapts different video standards through a Central Processing Unit (CPU) or other generic microprocessor on chip. The microprocessor is able to perform IDCT of different video standards; however, the performance is slow and consumes too much power.

Therefore, what is needed is an IDCT processor that is able to process different video standards and also meets processing speed requirements.

SUMMARY OF INVENTION

To solve the above problems, an embodiment of the present invention provides a unified inverse discrete cosine transform (IDCT) microcode processor engine, comprising: a read unit for reading input data; a shift left unit comprising: a first shift left block for left-shifting input data; and a second shift left block for left-shifting input data; an add unit for adding data output from the shift left unit; and a shift right unit for right-shifting data output from the add unit.

Another embodiment of the present invention provides a video decoding system, comprising: a decoder for decoding input; an inverse quantization block for performing inverse quantization of data output from the decoder; a microcode processor engine for performing IDCT of output from the inverse quantization block, comprising: a read unit for reading intermediate input data from input devices; a shift left unit comprising: a first shift left block for left-shifting intermediate input data; and a second shift left block for left-shifting intermediate input data; an add unit for adding data output from the shift left unit; and a shift right unit for right-shifting data output from the add unit.

Another embodiment of the present invention provides a method of inverse discrete cosine transform, comprising: performing a first operation on a first input data; performing a second operation on a second input data; adding output from the first operation and the second operation; and right-shifting output from the adding.

BRIEF DESCRIPTION OF THE DRAWINGS

Embodiments of the present invention are illustrated by way of example, and not by way of limitation, in the figures of the accompanying drawings, in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is discussed here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

The following discloses preferred embodiments of the unified inverse discrete cosine transform (IDCT) microcode processor engine, which are able to facilitate IDCT of various video standards without sacrificing speed. The video standards include, without limitation, ISO/IEC 11777 (also known as MPEG), ISO/IEC 13253 (also known as MPEG-2), ISO/IEC 14496 (also known as MPEG-4), ISO/IEC 14496-10 (also known as H.264/AVC) and SMPTE 421M (also known as VC-1). The processor engine works with a set of instructions that is generated from the system software to transform the coefficients into the residuals, where each set of instructions is associated with one of the standards. The lengths of the instruction sets are also based on the associated standard.

Figure 1:
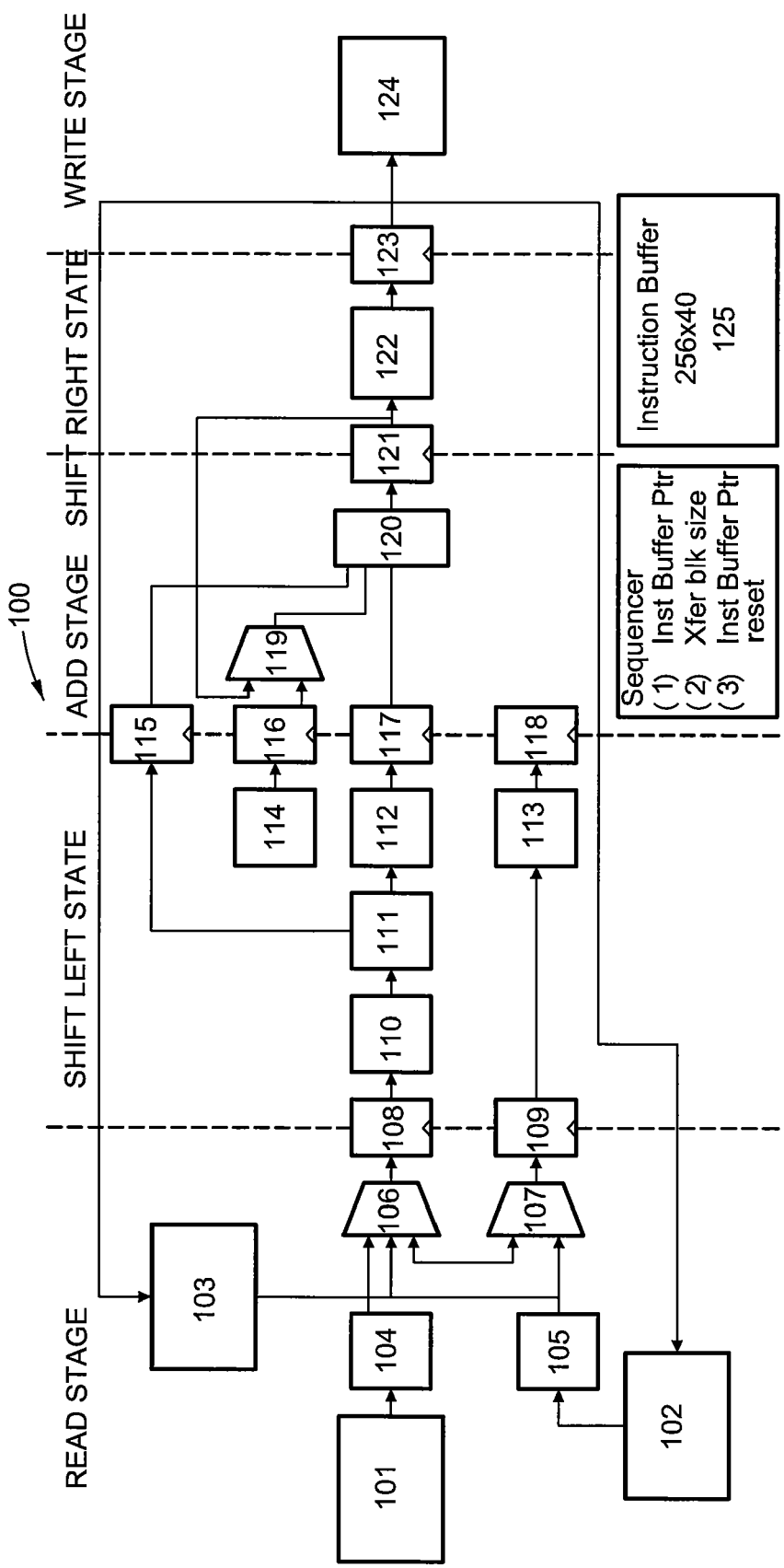
FIG. 1 illustrates a unified IDCT microcode processor engine, according to an embodiment of the present invention.

FIG. 1 illustrates a unified IDCT microcode processor engine 100 according to an embodiment of the present invention. In an embodiment, the processor engine 100 executes an instruction set wherein each instruction is 40-bit. The 40 bits in each instruction are defined as shown below in Tables 1, 2 and 3, wherein 34 bits of an instruction are defined, and 6 bits of the instruction are reserved. The reserved bits are for future functions to facilitate video standards developed later, which provides more flexibility and portability to the processor engine. Thus, the processor engine of the present invention can be used for various video standards at present and modified according to future developments.

TABLE 1

Instruction Definition

| Instruction Field Name | Bits | Stage | Description |
| --- | --- | --- | --- |
| Ra0 | 4:0 | Read Stage | Read address 0 for Transpose Registers and Input File. |
| Ra1 | 9:5 | Read Stage | Read address 1 for Register File, Transpose Registers and Input File. |
| I | 10:10 | Shift Left Stage | Invert data on data path one and set carry bit to true if subtraction is required. |
| ShL0 | 14:11 | Shift Left Stage | Left shift amount for data on data path two. |
| Sp | 15 | Shift Left Stage | Special op for H.264. 0 - no special op; 1 - (data1 & 1) << 2. |
| ShL1 | 19:16 | Shift Left Stage | Left shift amount for data on data path one. |
| CLUT | 23:20 | Shift Left Stage | Constant Lookup index. |
| Sc | 24:24 | Add Stage | Accumulator or constant mux selection strobe. |
| ShR | 28:25 | Shift Right Stage | Right shift amount. |
| Wa | 33:29 | Write Stage | Write address for Output RAM, Register File and Transpose Registers. |

TABLE 2

Ra0/Ra1 Address Space

| Ra0 [4:0] | Ra1[4:0] | Description |
| --- | --- | --- |
| 0-7 | Not used | IF0-IF7, Coefficient (input) ram row 0 through row 7 respectively. |
| 8-15 | 8-15 | TF0-TF7, Scratch Reg. column 0 through column 7 respectively. |
| 16-29 | 16-29 | RF1-RF14, Register File (14 × 152 b) |
| 30 | 30 | Reserved |
| 31 | 31 | RF0 - No read. Assert "0" to the input port. |

TABLE 3

Wa Address Space

| Wa [4:0] | Description |
| --- | --- |
| 0-7 | OF0-OF7, Residual (output) ram row 0 through row 7 respectively. |
| 8-15 | TF0-TF7, Scratch Reg. row 0 through row 7 respectively. |
| 16-29 | RF1-RF14, Register File (14 × 152 b) |
| 30 | Reserved |
| 31 | RF0 - No write. |

As shown in FIG. 1, the processor engine 100 comprises a pipeline having five stages, and they are the read stage, shift left stage, add stage, shift right stage and write stage. To clarify the diagram, each stage is separated by a broken line. The processor engine executes each instruction in the five stages of the pipeline. Furthermore, in order to meet the performance requirement, eight instances of the transformation are processed in parallel in the processor. The registers in the processor engine are able to accommodate all eight instances in terms of bit numbers. The following paragraphs describe the process of each stage.

Read Stage

According to FIG. 1, at the read stage a read unit comprises an input buffer 101; a transpose register 102; a register file 103; two sign extension blocks 104, 105; two read multiplexers 106, 107; and two read buffers 108, 109. The input coefficients are read from the input buffer 101 in columns and extended with the sign extension block 104 to become a 19-bit signed value. The intermediate data read from the transpose register 102 are also extended to become a 19-bit signed value through the sign extension block 105. The register file 103 comprises intermediate data from the first pass or the second pass and the intermediate data read from the register file 103 are in the form of 19-bit signed value; therefore, the data does not require sign extension. The first read multiplexer 106 selects an input read from the register file 103, the input buffer 101 and the transpose register 102 according to an instruction. The set of instructions is stored in an instruction buffer 125. The first read multiplexer 106 selects the input according to Bits 4-0 of the instruction. Likewise, the second read multiplexer 107 selects an input from the register file 103 and the transpose register 102 according to Bits 9-5 of the instruction. The inputs selected by the first read multiplexer 106 and the second read multiplexer 107 are stored in the first read buffer 108 and the second read buffer 109, respectively. The size of each of the first read buffer 108 and the second read buffer 109 is preferably 152-bits in order to accommodate data of all eight instances.

Shift Left Stage

From FIG. 1, it can be understood that at the shift left stage a shift left unit comprises two data paths. Data path one comprises a first operation block 110, a second operation block 111 and a third operation block 112, whereas data path two comprises a fourth operation block 113. Data stored in the first read buffer 108 is fed into data path one, wherein the data is processed in each block according to the instruction. When Bit 15 of the instruction (Sp bit) is set to be true, the video standard is determined to be H.264 and the first operation block 110 firstly performs an AND operation on the data with 1, then invert the data, finally shift the data to the left by 2 bits. If the process requires a subtraction as instructed by Bit 10 of the instruction, the second operation block 111 inverts all bits of the data and sets a carry bit to true. The carry bit is shared by all 8 instances and stored in the first shift left buffer 115. The third operation block 112 left-shifts the data, and the amount of the left-shift is controlled by Bits 19-16 of the instruction. The data output from the third operation block 112 is stored in the third shift left buffer 117. On the other hand, data path two simply performs left-shifting on data stored in the second read buffer 109 by the fourth operation block 113. The amount of left-shift is controlled by Bits 14-11 of the instruction. The data output from the fourth operation block 113 is stored in the fourth shift left buffer 118. The shift left stage further comprises a constant lookup block 114, which maps different constant values required in the calculation and is controlled by Bits 23-20 of the instruction. Bits 23-20 of the instruction pass a constant lookup index to the constant lookup block 114, and the constant lookup block 114 provides a constant value from a constant lookup table as illustrated below in Table 4. Different constant values displayed in the constant lookup table are used for video standards. The size of the first shift left buffer 115 is preferably 1-bit; the size of the second shift left buffer 116 is 30-bits; the size of the third shift left buffer 117 is 240-bits; and the size of the fourth shift left buffer 118 is 240-bits in order to accommodate data of all eight instances.

TABLE 4

Constant Lookup Table

| Constant Lookup Index | Constant Value | Video standard |
| --- | --- | --- |
| 0 | 0 | All standard |
| 1 | 1 | Mpeg, H.264/p1/8, H.264/p2/8, VC1/p2/8 |
| 2 | 4 | Mpeg, VC1/p1/4, VC1/p1/8 |
| 3 | 6 | H.264/p1/8, H.264/p2/8 |
| 4 | 8 | H.264/p1/8 |
| 5 | 28 | Mpeg |
| 6 | 32 | H.264/p2/4 |
| 7 | 64 | H.264/p2/8, VC1/p2/4, VC1/p2/8 |
| 8 | 128 | Mpeg |
| 9 | 2 | H.264/p1/8 |
| 10 | Reserved | |
| 11 | Reserved | |
| 12 | −1 | Mpeg |
| 13 | −8 | Mpeg |
| 14 | 6 | H.264/p1/8 |
| 15 | Reserved | |

Add Stage

At the add stage, data from data path one and data path two with the carry bit and the constant value are accumulated. A previous accumulated value output from the add stage is also fed back to the add stage, so that the accumulated value can also be added to the data from data path one, data from data path two and the carry bit. The add stage comprises an add multiplexer 119, an adder 120 and an add buffer 121. The add multiplexer 119 selects between the constant value and the accumulated data, wherein the selection is controlled by Bit 24 of the instruction. The adder 120 adds the data of the first shift left buffer 115, the data selected by the add multiplexer 119, the data of the third shift left buffer 117 and the data of the fourth shift left buffer 118. The output of the adder is stored in the add buffer 121 and fed into the next stage. The add buffer 121 also feeds the accumulated data back to the add multiplexer 119 as shown in FIG. 1.

Shift Right Stage

The data fed in from the add buffer 121 is right-shifted by an amount controlled by Bits 28-25 of the instruction. The shifting is performed by a shift right block 122 and the resulting data after right-shifting is stored in a shift right buffer 123.

Write Stage

The data stored in the shift right buffer 123 is written into the register file 103, the transpose register 102 or a residual random access memory (RAM) 124. Data during the pass executions are written into the register file 103. The data resulting from the first pass is written into the transpose register 102 and the data resulting from the second pass is written into the residual RAM 124. If the residual RAM 120 is full or not ready, the processor engine 110 stalls.

Figure 2:
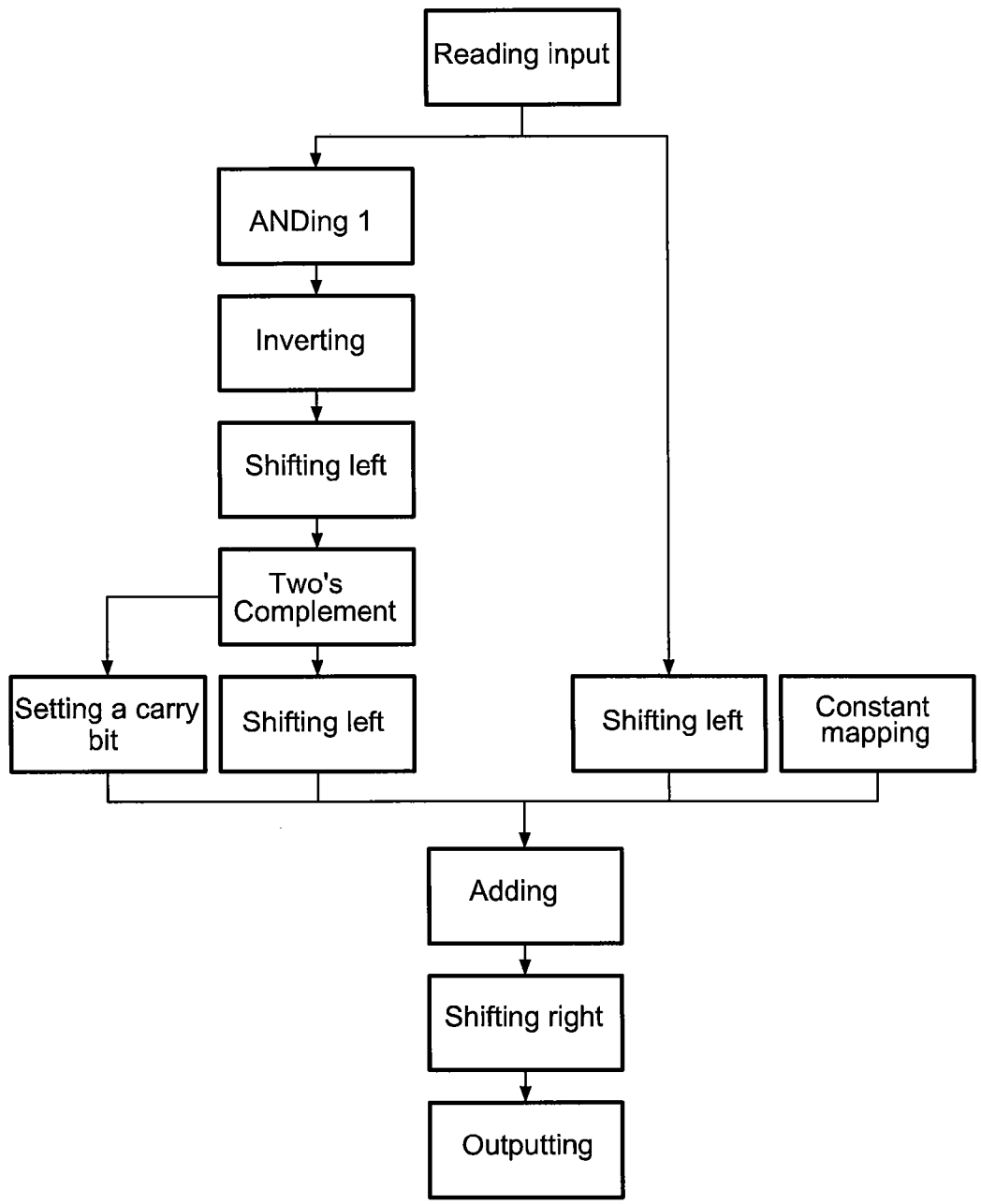
FIG. 2 illustrates a flow chart of an IDCT method based on the unified IDCT microcode processor engine, according to another embodiment of the present invention.

The following further discloses preferred embodiments of a method of IDCT based on the IDCT microcode processor engine, which are able to facilitate IDCT of various video standards without sacrificing speed. As shown in FIG. 2, the method comprises: reading input data from input devices; performing a first shift left on a first input data; performing a second shift left on a second input data; adding output from the first shift left and the second shift left; right-shifting output from the adding; and outputting data stored in the shift right buffer to an output device.

The input data comprises the first input data and a second input data, wherein the first input data is selected from an input buffer, a transpose register and a register file; and the second input data is selected from a transpose register and a register file. The selections of the first input data and the second input data are controlled by an instruction.

The first shift left on the first input data as shown in FIG. 2 comprises performing an AND 1 operation on the first input data, followed by inverting, shifting left, a two's complement operation and shifting left again. While performing the two's complement, a carry bit can also be set to be TRUE. Also shown in FIG. 2 that the second shift left on the second input data comprises a step of shifting left. A constant is mapped according to a constant lookup table, such as Table 4, wherein the mapping is controlled by an instruction.

The step of adding data further comprises selecting between the constant and an accumulated data, which is a result from the adding step. In the adding step, the data output from the first operation, the data output from the second operation, the carry bit and the selected data are added together. Subsequently, the data output from the adding step is shifted right by an amount according to an instruction, then output to an output device. The output device selected from a register file, a residual RAM or a transpose register according to an instruction.

Figure 3:
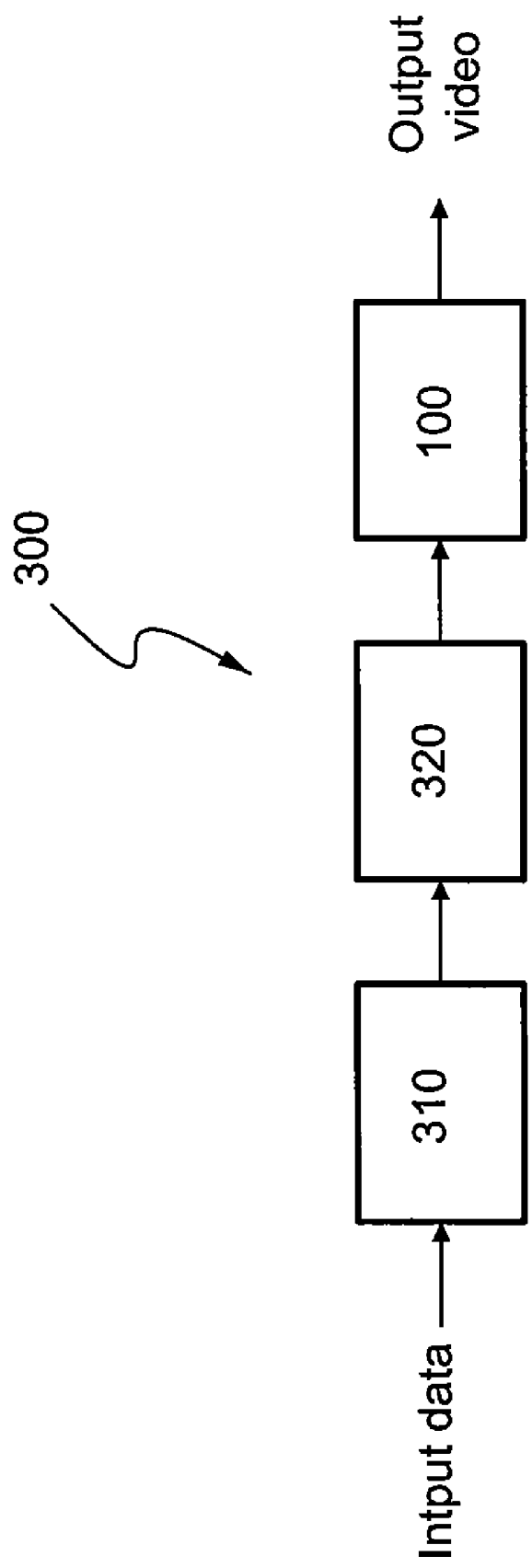
FIG. 3 illustrates a video decoding system based on the unified IDCT microcode processor engine, according to another embodiment of the present invention.

The following further discloses preferred embodiments of a video decoding system based on the IDCT microcode processor engine, which are able to facilitate IDCT of various video standards without sacrificing speed. The video decoding system 300, please refer to FIG. 3, comprises a decoder 310 for decoding input; an inverse quantization block 320 for performing inverse quantization of data output from the decoder; the unified IDCT microcode processor engine 100 as previously described. The decoder 310 is preferably a Huffman or run-length decoder, in which the input data stream is decoded and fed into the inverse quantization block 320. In the inverse quantization block 220, the input data stream is de-quantized before feeing into the unified IDCT microcode processor engine 100. The unified IDCT microcode processor engine 100 then reconstructs the input data stream and outputs a video. The output video can be further processed for motion compensation or other post-processing.

Although the embodiments disclosed above are discussed in the scope of providing solutions in response to a need for daily and healthy diet, one of ordinary skill in the art can easily adopt the same processor engine or method for the providing of other type of purposes. Variations, modifications, and other implementations of what is described herein will occur to those of ordinary skill in the art without departing from the spirit and scope of the present invention as claimed. Accordingly, the present invention is to be defined not by the preceding illustrative description but instead by the spirit and scope of the following claims.

The invention claimed is:

1. A microcode processor engine for inverse discrete cosine transform (IDCT), comprising:
   a read unit for reading input data;
   a shift left unit comprising:
      a first shift left block for left-shifting input data; and
      a second shift left block for left-shifting input data;
   an add unit for adding data output from the shift left unit; and
   a shift right unit for right-shifting data output from the add unit.

2. The microcode processor engine according to claim 1, wherein the read unit comprises:
   a first read multiplexer for selecting input data from input devices; and
   a second read multiplexer for selecting input data from input devices.

3. The microcode processor engine according to claim 2, wherein the input devices comprise a register file, an input buffer and a transpose register.

4. The microcode processor engine according to claim 1, wherein the first shift left block further comprises:
   a first operation block for performing an H264 operation on the input data;
   a second operation block for performing two's complement on data output from the first operation block; and
   a third operation block for performing left-shifting on data output from the second operation block.

5. The microcode processor engine according to claim 1, wherein the H264 operation comprising:
   performing an AND operation on the first input data;
   inverting data output from the AND operation; and
   shifting data output from the inverting by two bits.

6. The microcode processor engine according to claim 1, wherein the second shift left block further comprises a fourth operation block for performing left-shifting.

7. The microcode processor engine according to claim 1, wherein the left shift unit further comprises a constant lookup block for mapping constant values.

8. The microcode processor engine according to claim 1, wherein the add unit comprises:
   an add multiplexer for selecting from an accumulated data and data output from the shift left unit; and
   an adder for adding an output of the add multiplexer with data output from the shift left unit.

9. The microcode processor engine according to claim 1, further comprising a shift right buffer for storing data output from the shift right unit and outputting it to an output device.

10. The microcode processor engine according to claim 9, wherein the output device is one of register file, a residual random access memory (RAM) and a transpose register.

11. A video decoding system, comprising:
   a decoder for decoding input;
   an inverse quantization block for performing inverse quantization of data output from the decoder;
   a microcode processor engine for performing inverse discrete cosine transform (IDCT) of output from the inverse quantization block, comprising:
      a read unit for reading intermediate input data from input devices;
      a shift left unit comprising:
         a first shift left block for left-shifting intermediate input data; and
         a second shift left block for left-shifting intermediate input data;
      an add unit for adding data output from the shift left unit; and
      a shift right unit for right-shifting data output from the add unit.

12. The video decoding system according to claim 11, wherein the read unit comprises:
   a first read multiplexer for selecting input data from input devices; and
   a second read multiplexer for selecting input data from input devices.

13. The video decoding system according to claim 12, wherein the input devices comprise a register file, an input buffer and a transpose register.

14. The video decoding system according to claim 11, wherein the first shift left block further comprises:
   a first operation block for performing an H264 operation on the input data;
   a second operation block for performing two's complement on data output from the first operation block; and
   a third operation block for performing left-shifting on data output from the second operation block.

15. The video decoding system according to claim 11, wherein the H264 operation comprising:
   performing an AND operation on the first input data;
   inverting data output from the AND operation; and
   shifting data output from the inverting by two bits.

16. The video decoding system according to claim 11, wherein the second shift left block further comprises a fourth operation block for performing left-shifting.

17. The video decoding system according to claim 11, wherein the left shift unit further comprises a constant lookup block for mapping constant values.

18. The video decoding system according to claim 17, wherein the add unit comprises:
   an add multiplexer for selecting from an accumulated data and data output from the shift left unit; and
   an adder for adding an output of the add multiplexer with data output from the shift left unit.

19. The video decoding system according to claim 11, wherein microcode processor engine further comprises a shift right buffer for storing data output from the shift right unit and outputting it to an output device.

20. The video decoding system according to claim 19, wherein the output device is one of register file, a residual random access memory (RAM) and a transpose register.

* * * * *